W. G. McGargy,
Water Wheel.
No. 67,203.          Patented July 30, 1867.
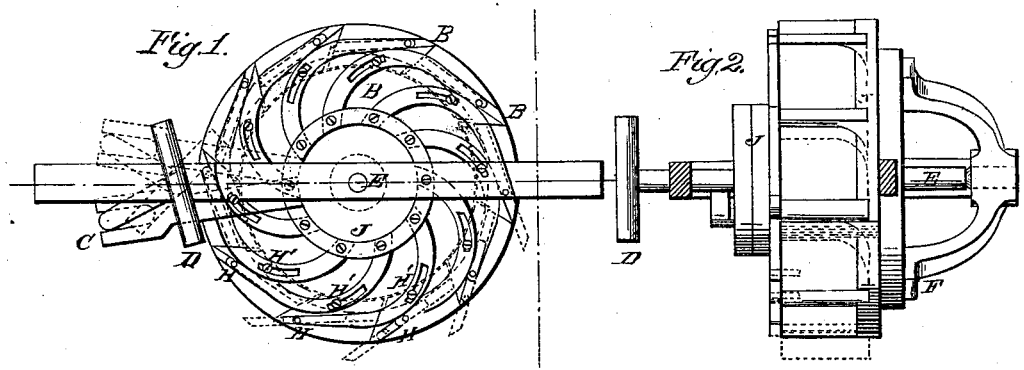
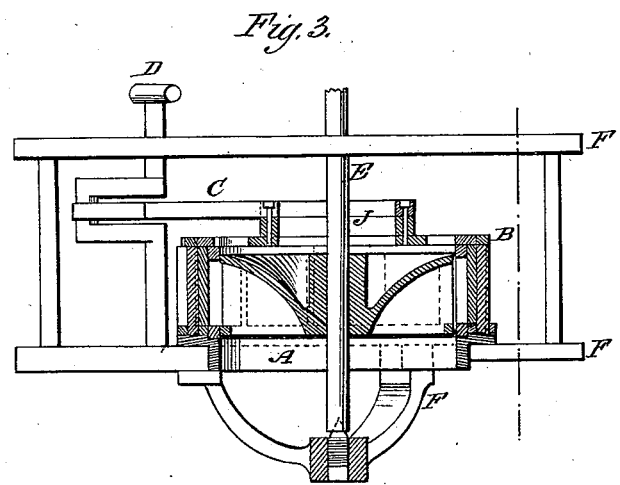
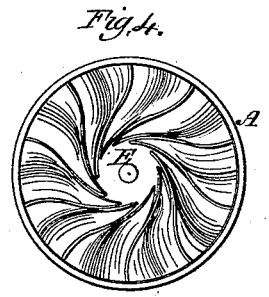
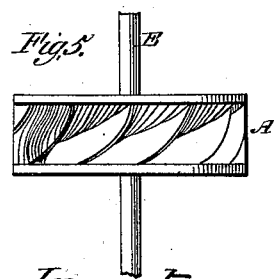
Witnesses.
Inventor.
By his atty, William G. McGargy
J Franklin Reigart

United States Patent Office

WILLIAM G. McGARGY, OF KUTZTOWN, PENNSYLVANIA.

Letters Patent No. 67,203, dated July 30, 1867.

IMPROVEMENT IN WATER-WHEELS.

*The Schedule referred to in these Letters Patent and making part of the same.*

TO ALL WHOM IT MAY CONCERN:

Be it known that I, WILLIAM G. McGARGY, of Kutztown, Berks county, and State of Pennsylvania, have invented an Improved Water-Wheel; and I do hereby declare the following to be an exact description thereof, reference being had to the accompanying drawings, and to the letters of reference marked thereon, making a part of this specification, of which—

Figure 1 represents a top view of the adjustable gates.

Figure 2 a side view, and

Figure 3 a cross-section. The red lines show the gates open.

Figure 4 an end view of the wheel.

Figure 5 a side view of the wheel.

The nature of my invention consists in the slanting scroll-buckets extending behind the centre, so as to increase the suction of the wheel; and the sliding-gates, in combination with the sliding-lever, for opening and closing the gates.

A represents the scroll-buckets of the wheel, that are slanting, and extend beyond the centre and behind the spindle E. F is the frame that supports the wheel and the gates B. The gates B curve from the centre to the periphery, and are thrust out and opened by means of a sliding-lever C and crank D. The arms of the gates at their outer ends being connected to the gates by pins H H, the screws H' H' working in a slot near the middle of the arms, and the inner ends of the arms being attached to the circular collar J at the one end of the lever C, the other end of lever C being attached to the shaft of the crank D, so that by slightly turning the crank D the gates are opened or closed, and give a direct action of the water upon the buckets of the wheel A.

What I claim as my invention, and desire to secure by Letters Patent, is—

The slanting scroll-buckets A, sliding-gates B, lever C, and crank D, when constructed, arranged, and operated as herein described, and for the purposes set forth.

WILLIAM G. McGARGY.

Witnesses:
 LEVI GERBER,
 FREDERICK S. ZEHM.